(12) United States Patent
Endo

(10) Patent No.: US 11,936,519 B2
(45) Date of Patent: Mar. 19, 2024

(54) SERVER APPARATUS, WIRELESS BASE STATION, MONITORING APPARATUS, COMMUNICATION CONTROLLING METHOD, NON-TRANSITORY COMPUTER-READABLE MEDIUM, AND COMMUNICATION SYSTEM

(71) Applicant: NEC Corporation, Tokyo (JP)

(72) Inventor: Hiroya Endo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 144 days.

(21) Appl. No.: 17/637,164

(22) PCT Filed: Jul. 7, 2021

(86) PCT No.: PCT/JP2021/025660
§ 371 (c)(1),
(2) Date: Feb. 22, 2022

(87) PCT Pub. No.: WO2022/038914
PCT Pub. Date: Feb. 24, 2022

(65) Prior Publication Data
US 2023/0353449 A1 Nov. 2, 2023

(30) Foreign Application Priority Data
Aug. 18, 2020 (JP) ................................. 2020-137926

(51) Int. Cl.
*H04L 41/0806* (2022.01)
*H04L 12/46* (2006.01)
(Continued)

(52) U.S. Cl.
CPC ...... *H04L 41/0806* (2013.01); *H04L 12/4641* (2013.01); *H04L 41/0889* (2013.01); *H04L 61/5014* (2022.05); *H04L 2101/622* (2022.05)

(58) Field of Classification Search
CPC ............. H04L 41/0806; H04L 41/0889; H04L 61/5014; H04L 12/4641; H04L 2101/622
(Continued)

(56) References Cited

U.S. PATENT DOCUMENTS 7,385,973 B1 6/2008 Johnson et al.
9,572,085 B1 * 2/2017 Cope ..................... H04W 48/00
(Continued)

FOREIGN PATENT DOCUMENTS

CN 104967985 A * 10/2015 ......... H04L 61/2015
CN 104967985 A 10/2015
(Continued)

OTHER PUBLICATIONS

Admin AfterAcademy, "What is DHCP and how does it work?", Feb. 2020, AfterAcademy, https://afteracademy.com/blog/what-is-dhcp-and-how-does-it-work/ (Year: 2020).*
(Continued)

*Primary Examiner* — Ruolei Zong
(74) *Attorney, Agent, or Firm* — Sughrue Mion, PLLC

(57) ABSTRACT

Provided is a server apparatus capable of reducing a workload in a setting process. A server apparatus (10) includes: a registering unit (11) configured to register first address information set in a monitoring apparatus (30) that monitors a wireless base station (20) and VLAN setting information serving as setting information of a Virtual Local Area Network (VLAN) including the monitoring apparatus (30); a receiving unit (12) configured to receive, from the wireless base station (20), an assignment request for second address information; and a transmitting unit (13) configured to transmit the first address information, the second address information, and the VLAN setting information to the wireless base station (20).

8 Claims, 10 Drawing Sheets

(51) Int. Cl.
   *H04L 41/08* (2022.01)
   *H04L 61/5014* (2022.01)
   *H04L 101/622* (2022.01)

(58) Field of Classification Search
   USPC .......................................................... 709/224
   See application file for complete search history.

(56) References Cited

U.S. PATENT DOCUMENTS

| | | | |
|---|---|---|---|
| 11,075,878 B2* | 7/2021 | Yadav | H04L 41/0803 |
| 2005/0198629 A1* | 9/2005 | Vishwanath | G06F 8/61 |
| | | | 717/174 |
| 2008/0089323 A1* | 4/2008 | Elias | H04L 61/5014 |
| | | | 370/389 |
| 2009/0233609 A1* | 9/2009 | Iun | H04W 24/02 |
| | | | 455/445 |
| 2011/0004747 A1* | 1/2011 | Venkatachalam | H04W 52/10 |
| | | | 713/2 |
| 2012/0127975 A1* | 5/2012 | Yang | H04W 76/19 |
| | | | 370/338 |
| 2015/0063161 A1 | 3/2015 | Homma et al. | |

FOREIGN PATENT DOCUMENTS

| | | | |
|---|---|---|---|
| JP | 2004304280 A | * | 10/2004 |
| JP | 2007-150892 A | | 6/2007 |
| JP | 2015-046660 A | | 3/2015 |
| JP | 2016-019205 A | | 2/2016 |
| JP | 2017-038218 A | | 2/2017 |
| KR | 20160084164 A | | 7/2016 |

OTHER PUBLICATIONS

Na, machine translation of CN Patent Application 104967985, Oct. 7, 2015 (Year: 2015).*
Japanese Office Action for JP Application No. 2022-508868, dated Jan. 24, 2023 with English Translation.
Extended European Search Report for EP Application No. 21857013.3, dated Sep. 13, 2022.
C. Zhu, Y. Tu, ZTE Corporation, "VLAN Identifier option in DHCP", draft-zhu-dhc-vlan-id-option-01.txt, IETF, Apr. 17, 2013.
Anonymous, "Tutorial—How to setup DHCP option 132 for VoIP use": mikrotik, Dec. 31, 2015.
International Search Report for PCT Application No. PCT/JP2021/025660, dated Sep. 14, 2021.

* cited by examiner

SERVER APPARATUS, WIRELESS BASE STATION, MONITORING APPARATUS, COMMUNICATION CONTROLLING METHOD, NON-TRANSITORY COMPUTER-READABLE MEDIUM, AND COMMUNICATION SYSTEM

This application is a National Stage Entry of PCT/JP2021/025660 filed on Jul. 7, 2021, which claims priority from Japanese Patent Application 2020-137926 filed on Aug. 18, 2020, the contents of all of which are incorporated herein by reference, in their entirety.

TECHNICAL FIELD

The present disclosure is related to a server apparatus, a wireless base station, a monitoring apparatus, a communication controlling method, and a communication controlling program.

BACKGROUND ART

In recent years, local mobile communication systems constructed in corporations, for example, are known. A local mobile communication system includes a small wireless base station and a monitoring apparatus that monitors and controls the base station, so that the small wireless base station provides a local mobile communication service.

As for an Internet Protocol (IP) address used by a so-called local network, which is a network to which the small wireless base station is connected, a different address is used by each local network. Generally speaking, small wireless base stations are mass produced, because of being sold in large quantities and being sold to purchasers who are not specific clients. For these reasons, small wireless base stations are sold without being pre-set with address information of the small wireless base station and a monitoring apparatus, which is necessary at the time of connecting to the local network. Accordingly, after each small wireless base station is connected to the local network, an administrator or a user of the local network would manually set the address information into the small wireless base station. Consequently, as the number of small wireless base stations to be arranged in a local network increases, workload of the user or the like in the manual setting process would become extremely large.

To cope with this situation, a technique is known (e.g., Patent Literature 1 and 2) by which address information is automatically assigned by using a Dynamic Host Configuration Protocol (DHCP) server, for the purpose of reducing the workload required of the user or the like to manually set the address information. Patent Literature 1 discloses a Dynamic Host Configuration Protocol (DHCP) server that transmits the name of a wireless Access Point (AP) and an Internet Protocol (IP) address of a management server to the wireless AP. Patent Literature 2 discloses a DHCP server that distributes an IP address, a subnet mask, and a default gateway to a wireless base station.

CITATION LIST

Patent Literature

Patent Literature 1: Japanese Unexamined Patent Application Publication No. 2015-046660
Patent Literature 2: Japanese Unexamined Patent Application Publication No. 2007-150892

SUMMARY OF INVENTION

Technical Problem

In relation to the above, because local mobile communication systems use local networks, there is a demand that security be ensured. Each small wireless base station connected to a local network is set with setting information used for ensuring the security, in addition to the address information. Although Patent Literature 1 and 2 disclose the techniques for automatically setting the address information, automatically setting the setting information besides the address information is not taken into consideration. For this reason, when a small wireless base station is to be set with the setting information besides the address information, using the techniques disclosed in Patent Literature 1 and 2 does not make it possible to automatically set the setting information besides the address information. Consequently, when small wireless base stations are to be set with the setting information besides the address information, the user or the like would be required to manually set the setting information into each of all the small wireless base stations. Thus, there is a possibility the user or the like might be required to perform an extremely large workload in the setting process.

To solve the problem described above, an object of the present disclosure is to provide a server apparatus, a wireless base station, a monitoring apparatus, a communication controlling method, and a communication controlling program that are capable of reducing the workload in the setting process.

Solution to Problem

A server apparatus of the present disclosure includes:
a registering unit configured to register first address information set in a monitoring apparatus that monitors a wireless base station and VLAN setting information serving as setting information of a Virtual Local Area Network (VLAN) including the monitoring apparatus;
a receiving unit configured to receive, from the wireless base station, an assignment request for second address information; and
a transmitting unit configured to transmit the first address information, the second address information, and the VLAN setting information to the wireless base station.

A wireless base station of the present disclosure includes:
a transmitting unit configured to transmit, to a server apparatus, an assignment request for first address information;
a receiving unit configured to receive, from the server apparatus, VLAN setting information serving as setting information of a Virtual Local Area Network (VLAN) including a monitoring apparatus, the first address information, and second address information set in the monitoring apparatus; and
a communication controlling unit configured to communicate with the monitoring apparatus via the VLAN, by using the first address information, the second address information, and the VLAN setting information.

A monitoring apparatus of the present disclosure includes:
- a managing unit configured to receive an input of first address information set in a wireless base station and VLAN setting information serving as setting information of a Virtual Local Area Network (VLAN) including the monitoring apparatus; and
- a controlling unit configured to register, in a server apparatus, the first address information, the VLAN setting information, and second address information set in the monitoring apparatus and configured to communicate with the wireless base station via the VLAN by using the first address information, the second address information, and the VLAN setting information.

A communication controlling method of the present disclosure includes:
- registering first address information set in a monitoring apparatus that monitors a wireless base station and VLAN setting information serving as setting information of a Virtual Local Area Network (VLAN) including the monitoring apparatus;
- receiving, from the wireless base station, an assignment request for second address information; and
- transmitting, to the wireless base station, the first address information, the second address information, and the VLAN setting information.

A communication controlling method of the present disclosure includes:
- transmitting, to a server apparatus, an assignment request for first address information;
- receiving, from the server apparatus, VLAN setting information serving as setting information of a Virtual Local Area Network (VLAN) including a monitoring apparatus, the first address information, and second address information set in the monitoring apparatus; and
- communicating with the monitoring apparatus via the VLAN, by using the first address information, the second address information, and the VLAN setting information.

A communication controlling program of the present disclosure causes a computer to execute a process of:
- registering first address information set in a monitoring apparatus that monitors a wireless base station and VLAN setting information serving as setting information of a Virtual Local Area Network (VLAN) including the monitoring apparatus;
- receiving, from the wireless base station, an assignment request for second address information; and
- transmitting, to the wireless base station, the first address information, the second address information, and the VLAN setting information.

Advantageous Effects of Invention

According to the present disclosure, it is possible to provide a server apparatus, a wireless base station, a monitoring apparatus, a communication controlling method, and a communication controlling program that are capable of reducing the workload in the setting process.

DESCRIPTION OF EMBODIMENTS

Figure 1:
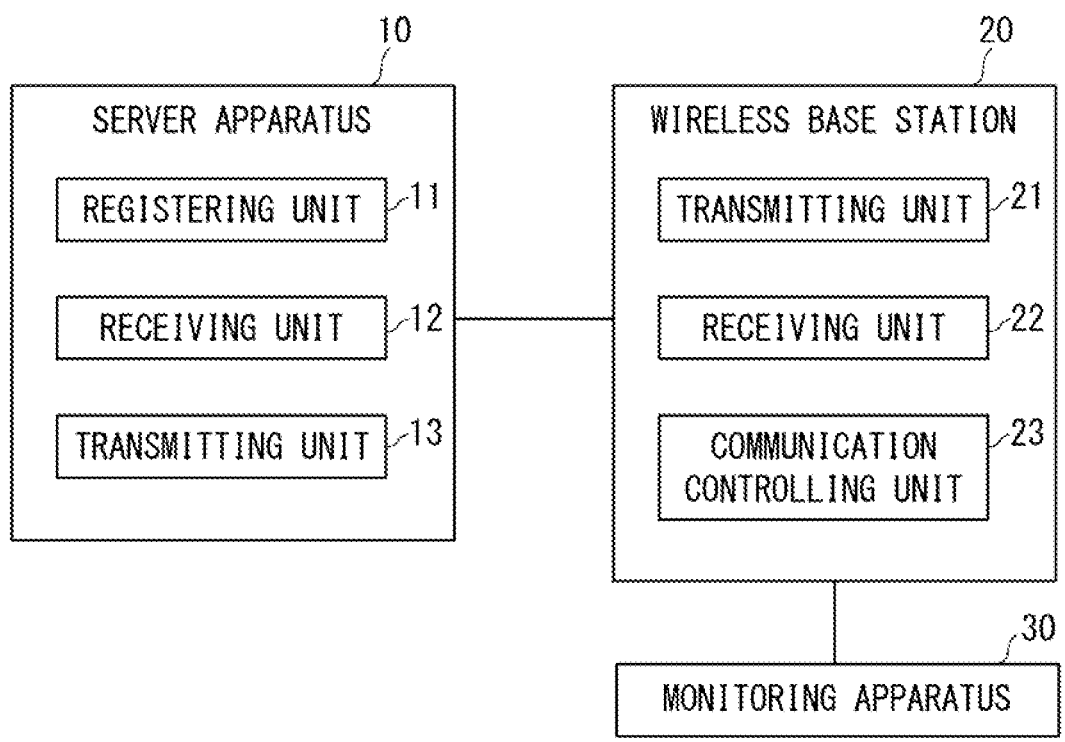
FIG. 1 is a block diagram showing an example configuration of a communication system according to a first example embodiment.

The following will describe example embodiments of the present disclosure with reference to the drawings. To make the explanations clearer, the description below and the drawings have omissions and are simplified as appropriate. Further, in the drawings referenced below, some of the elements that are the same as each other are referred to by using the same reference characters, and duplicate explanations thereof will be omitted as necessary.

First Example Embodiment

An example configuration of a communication system 100 according to a first example embodiment will be explained, with reference to FIG. 1. FIG. 1 is a block diagram showing an example configuration of the communication system according to the first example embodiment. The communication system 100 is a communication system using a local network such as an intra-corporation network, for example.

For example, the communication system 100 is a communication system that provides local mobile communication such as Shared eXtended Global Platform (sXGP) or a local 5G. The local mobile communication may be referred to as intra-corporation mobile communication when being constructed in a specific corporation and providing a mobile communication service while using the inside of the corporation as a communication area.

As shown in FIG. 1, the communication system 100 includes a server apparatus 10, a wireless base station 20, and a monitoring apparatus 30. Although FIG. 1 depicts the server apparatus 10 and the monitoring apparatus 30 as separate apparatuses, the monitoring apparatus 30 and the server apparatus 10 may be structured as a single apparatus. Further, although FIG. 1 depicts the communication system 100 including the one wireless base station 20, the communication system 100 may include two or more wireless base stations 20.

For example, the server apparatus 10 is a DHCP server. The server apparatus 10 connects to a local network, so as to connect to and communicate with the wireless base station 20 and the monitoring apparatus 30 via the local network.

The wireless base station 20 is a small wireless base station that connects to the local network. The wireless base station 20 is a so-called mass produced product. When having not been set with address information by a user after shipment from a factory, the wireless base station 20 is connected to the local network while in the state of having no address information and the like set therein. For example, the wireless base station 20 may be referred to as a Home evolved NodeB (HeNB), a Femto eNB, or a femto base station. The wireless base station 20 connects to and communicates with the server apparatus 10 and the monitoring apparatus 30 via the local network. Further, as explained later, the wireless base station 20 connects to and communicates with the monitoring apparatus 30 via a mobile communication network structured in the local network by the monitoring apparatus 30.

The monitoring apparatus 30 is a base station maintenance monitoring apparatus that monitors and controls the wireless base station 20. The monitoring apparatus 30 may be referred to as a Home eNodeB Management System (HeMS). For example, in the local network, the monitoring apparatus 30 structures the mobile communication network for which security is ensured by using network additional information such as a VLAN tag, for example. The mobile communication network is structured with a VLAN, for example. The monitoring apparatus 30 is included in the VLAN structuring the mobile communication network and connects to and communicates with the wireless base station 20 via the VLAN.

When VLAN setting information serving as setting information of the VLAN structuring the mobile communication network has been set in the wireless base station 20, the wireless base station 20 is able to connect to the VLAN. When having been set with the VLAN setting information, the wireless base station 20 is configured so as to be able to connect to and communicate with the monitoring apparatus 30 via the VLAN structuring the mobile communication network and thus provides local mobile communication for the user.

In this situation, when the monitoring apparatus 30 and the server apparatus 10 are structured as a single apparatus, the wireless base station 20 connects to and communicates with functions included in the server apparatus 10 via the local network. When the VLAN setting information has been set in the wireless base station 20, the wireless base station 20 connects to and communicates with functions included in the monitoring apparatus 30 via the VLAN structuring the mobile communication network and thus provides the local mobile communication for the user.

Next, an example configuration of the server apparatus 10 will be explained. The server apparatus 10 includes a registering unit 11, a receiving unit 12, and a transmitting unit 13.

The registering unit 11 registers, in the server apparatus 10, first address information set in the monitoring apparatus 30 and the VLAN setting information serving as the setting information of the VLAN including the monitoring apparatus 30. For example, the first address information may be an IP address or may be a Media Access Control (MAC) address.

As a result of an administrator or a user of the VLAN inputting the first address information and the VLAN setting information, the registering unit 11 may register the first address information and the VLAN setting information that have been input, into the server apparatus 10. Alternatively, the registering unit 11 may obtain the first address information and the VLAN setting information from a storage device connected to the monitoring apparatus 30 or to the server apparatus 10 so as to register the first address information and the VLAN setting information that have been obtained, into the server apparatus 10. In another example, the registering unit 11 may register the first address information and the VLAN setting information into the server apparatus 10, in accordance with registration control exercised by the monitoring apparatus 30 or another communication apparatus (not shown).

The registering unit 11 registers, in the server apparatus 10, as many pieces of VLAN setting information as the number of VLANs structuring the mobile communication network. In other words, when a plurality of wireless base stations 20 are connected to one VLAN, the registering unit 11 registers only one piece of VLAN setting information in the server apparatus 10. When each of the plurality of wireless base stations 20 is connected to two or more VLANs, the registering unit 11 registers a plurality of pieces of VLAN setting information in the server apparatus 10.

The receiving unit 12 receives, from the wireless base station 20, an assignment request for second address information. The second address information is address information to be assigned to the wireless base station 20 and may be an IP address to be assigned to the wireless base station 20. The assignment request for the second address information may be a DHCP Discover message serving as an assignment request for an IP address in a DHCP protocol.

The transmitting unit 13 transmits the first address information set in the monitoring apparatus 30, the second address information to be assigned to the wireless base station 20, and the VLAN setting information of the VLAN including the monitoring apparatus 30, to the wireless base station 20.

Next, an example configuration of the wireless base station 20 will be explained. The wireless base station 20 includes a transmitting unit 21, a receiving unit 22, and a communication controlling unit 23.

The transmitting unit 21 transmits, to the server apparatus 10, the assignment request for the second address information to be assigned to the wireless base station 20.

The receiving unit 22 receives, from the server apparatus 10, the VLAN setting information serving as the setting information of the VLAN including the monitoring apparatus 30, the second address information to be assigned to the wireless base station 20, and the first address information set in the monitoring apparatus 30.

By using the first address information, the second address information, and the VLAN setting information, the communication controlling unit 23 communicates with the monitoring apparatus 30 via the VLAN structuring the mobile communication network.

Figure 2:
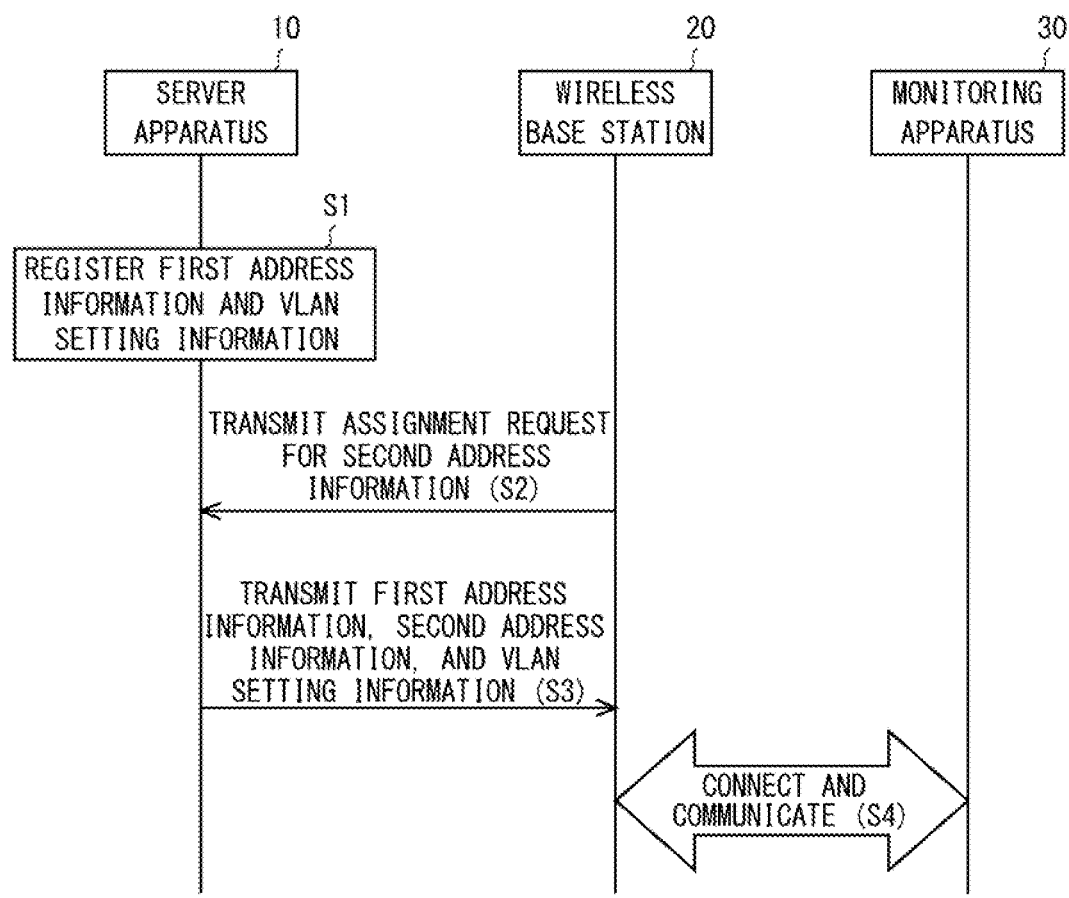
FIG. 2 is a sequence chart showing an example operation of the communication system according to the first example embodiment.

Next, an example operation of the communication system 100 according to the first example embodiment will be explained, with reference to FIG. 2. FIG. 2 is a sequence chart showing the example operation of the communication system according to the first example embodiment.

To begin with, the registering unit 11 registers the first address information set in the monitoring apparatus 30 and the VLAN setting information serving as the setting information of the VLAN including the monitoring apparatus 30 (step S1). In an example, step S1 may be performed before the wireless base station 20 connects to the local network.

Further, step S1 is performed as many as the number of VLAN structuring the mobile communication network. In other words, when a plurality of wireless base stations 20 are connected to a single VLAN, it is sufficient to set only one piece of VLAN setting information.

The transmitting unit 21 transmits, to the server apparatus 10, the assignment request for the second address information to be assigned to the wireless base station 20. The receiving unit 12 receives the assignment request from the transmitting unit 21 (step S2).

The transmitting unit 13 transmits, to the wireless base station 20, the first address information set in the monitoring apparatus 30, the second address information to be assigned to the wireless base station 20, and the VLAN setting information (step S3). In step S3, the receiving unit 22 receives the first address information, the second address information, and the VLAN setting information that were transmitted from the transmitting unit 13 (step S3).

By using the first address information, the second address information, and the VLAN setting information, the communication controlling unit 23 communicates with the monitoring apparatus 30 via the VLAN structuring the mobile communication network (step S4).

As explained above, the server apparatus 10 registers the first address information set in the monitoring apparatus 30 and the VLAN setting information of the VLAN which structures the mobile communication network and to which the wireless base station 20 is to connect. When the wireless base station 20 transmits, to the server apparatus 10, the assignment request for the second address information to be assigned to the wireless base station 20, the server apparatus 10 transmits the first address information, the second address information, and the VLAN setting information to the wireless base station 20. The wireless base station 20 receives the first address information, the second address information, and the VLAN setting information and connects to and communicates with the monitoring apparatus 30 via the VLAN structuring the mobile communication network, by using the first address information, the second address information, and the VLAN setting information. In other words, without the user or the like having to manually set the first address information, the second address information, and the VLAN setting information in the wireless base station 20, the wireless base station 20 is able to obtain the first address information, the second address information, and the VLAN setting information from the server apparatus 10. Further, by using the first address information, the second address information, and the VLAN setting information that were obtained, the wireless base station 20 is able to connect to the VLAN structuring the mobile communication network.

In this situation, the server apparatus 10 has registered therein as many pieces of VLAN setting information as the number of VLANs which structure the mobile communication network and to which the wireless base station 20 can be connected. Generally speaking, to VLANs structuring a mobile communication network, a plurality of wireless base stations 20 can be connected. In the present example embodiment, without the user having to manually set the VLAN setting information in each of all the wireless base stations 20, the VLAN setting information is set in all the wireless base stations 20 by simply registering, in the server apparatus 10, as many pieces of VLAN setting information as the number of VLANs. Accordingly, in the communication system 100 according to the first example embodiment, there is no need for the user to set the VLAN setting information in each of all the wireless base stations 20. It is therefore possible to reduce the workload in the setting process.

Second Example Embodiment

Next, a second example embodiment will be explained. The second example embodiment is an example embodiment obtained by making the first example embodiment more specific. At first, before explaining the details of the second example embodiment, a general setting sequence at the time of connecting a small wireless base station to a mobile communication network will be explained, so as to outline problems to be addressed by the present example embodiment.

Figure 3:
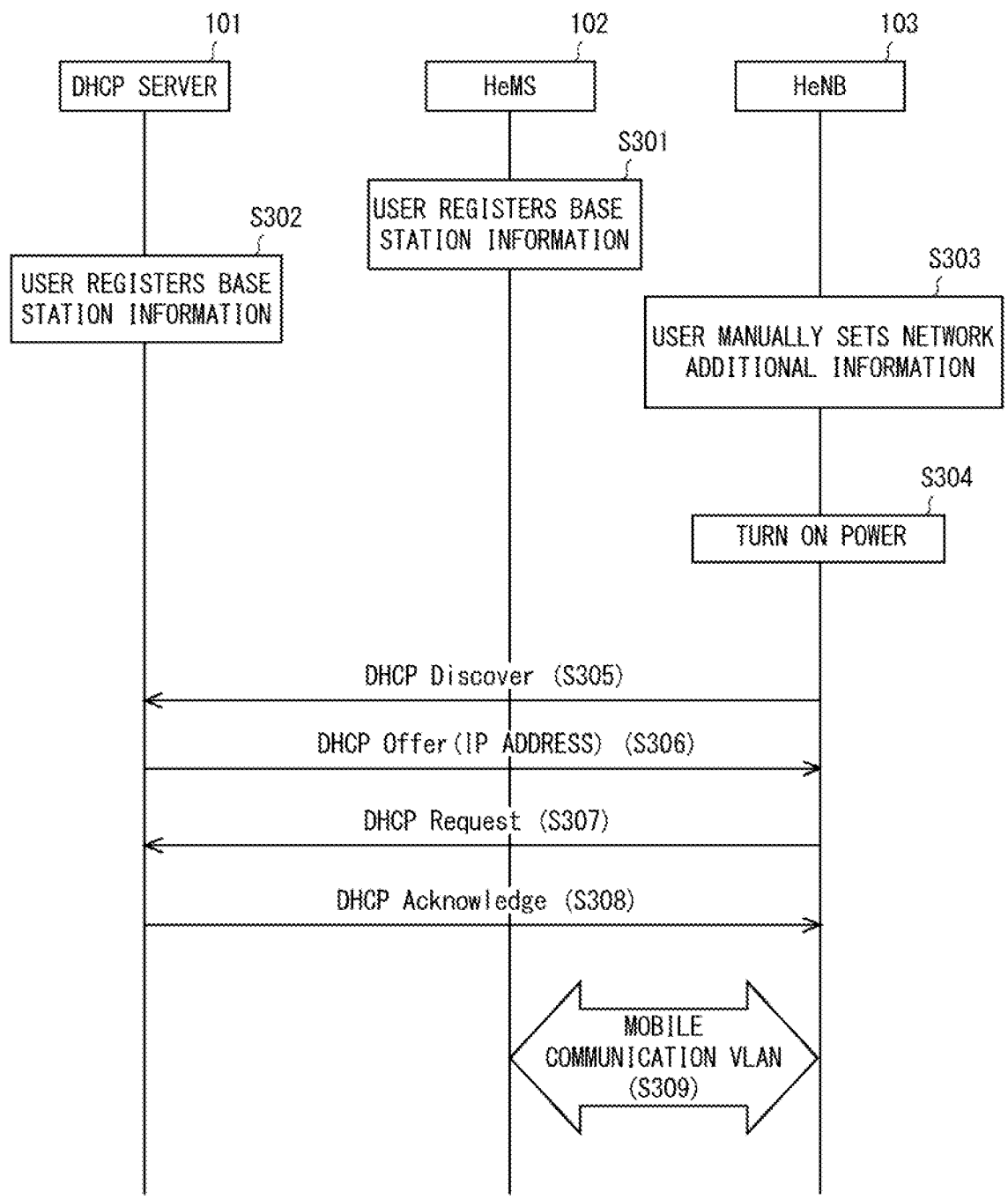
FIG. 3 is a chart showing a general setting sequence at the time of connecting a small wireless base station to a mobile communication network.

FIG. 3 is a chart showing the general setting sequence at the time of connecting the small wireless base station to the mobile communication network. In FIG. 3, a DHCP server 101 corresponds to the server apparatus 10 according to the first example embodiment, while a HeMS 102 corresponds to the monitoring apparatus 30 according to the first example embodiment, and an HeNB 103 corresponds to the wireless base station 20 according to the first example embodiment.

A user registers base station information of the HeNB 103 in the HeMS 102 (step S301) and registers the base station information of the HeNB 103 in the DHCP server 101 (step S302). The user manually sets network additional information into the HeNB 103 (step S303). The network additional information includes address information set in the HeMS 102 and VLAN setting information of a VLAN structuring the mobile communication network. In this situation, steps S301 through S303 may be performed according to the sequential order of S301, S302, and S303 or may be performed in a different sequential order.

Subsequently, the HeNB 103 is connected to the mobile communication network, and the user turns on the power of the HeNB 103 (step S304). When having not been set with address information by the user or the like after shipment from the factory, the HeNB 103 transmits, to the DHCP server 101, a DHCP Discover message serving as an assignment request for an IP address (step S305). The DHCP server 101 transmits, to the HeNB 103, a DHCP Offer message used for transmitting the IP address to be assigned to the HeNB 103 (step S306).

The DHCP server 101 and the HeNB 103 transmit and receive a DHCP Request message (step S307) and transmit and receive a DHCP Acknowledge message (step S308). By using the network additional information set in step S303 and the IP address assigned in step S306, the HeNB 103 connects to the HeMS 102 via the VLAN structuring the mobile communication network (step S309).

In the general setting sequence described above, when the HeNB 103 being a small wireless base station is connected to the mobile communication network, the user needs to set, in steps S301 and S302, the base station information into the HeMS 102 and into the DHCP server 101 in a duplicate manner. Also, the user needs to manually set, in step S303, the network additional information into the HeNB 103.

In this regard, generally speaking, a large number of HeNBs 103 are connected to the mobile communication network. Accordingly, the user needs to set as many pieces of network additional information as the number of HeNBs 103, into the DHCP server 101, the HeMS 102, and all the HeNBs 103. Consequently, in the general setting sequence shown in FIG. 3, as the number of HeNBs 103 increases, the workload of the user in the setting process becomes extremely large, and a lot of work and effort is required from the user. To cope with this situation, when the HeNB 103 is to be connected to the mobile communication network, the present example embodiment realizes a configuration that makes it possible to reduce the workload performed by the user in the setting process.

<An Example Configuration of a Communication System>

Figure 4:
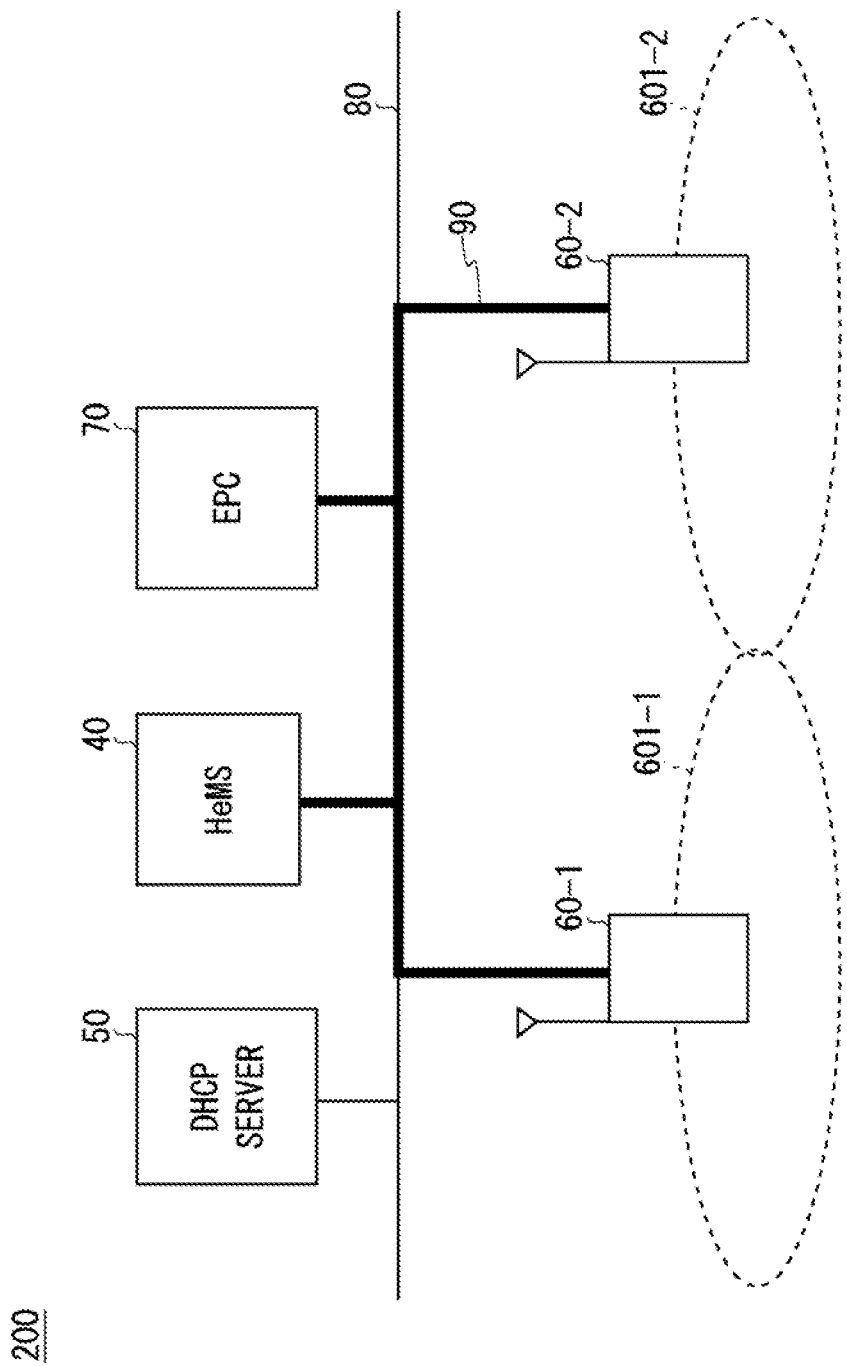
FIG. 4 is a diagram showing an example configuration of a communication system according to a second example embodiment.

An example configuration of a communication system 200 according to the second example embodiment will be explained, with reference to FIG. 4. FIG. 4 is a diagram showing an example configuration of the communication system according to the second example embodiment. The communication system 200 corresponds to the communication system 100 according to the first example embodiment. Similarly to the first example embodiment, the communication system 200 is, for example, a communication system that provides local mobile communication, such as sXGP or a local 5G. For the sake of convenience in the explanations, the communication system 200 will be assumed to be an intra-corporation mobile communication system using an intra-corporation mobile network. The communication system 200 includes a HeMS 40, a DHCP server 50, HeNBs 60-1 and 60-2, and an Evolved Packet Core (EPC) 70.

The HeMS 40 corresponds to the monitoring apparatus 30 according to the first example embodiment. The HeMS 40 is connected to an intra-corporation IP network 80 serving as an intra-corporation network. The HeMS 40 is a base station maintenance monitoring apparatus that structures a mobile communication VLAN 90 within the intra-corporation IP network 80 and is included in the mobile communication VLAN 90.

In FIG. 4, the solid line (the thinner solid line) connecting the HeMS 40, the DHCP server 50, the HeNBs 60-1 and 60-2, and the EPC 70 represents the intra-corporation IP network 80. Further, within the intra-corporation IP network 80, the part indicated with the thicker solid line is the mobile communication VLAN 90. It is indicated that the HeMS 40, the HeNBs 60-1 and 60-2, and the EPC 70 are connected together via the mobile communication VLAN 90.

When the HeNBs 60-1 and 60-2 have connected to the mobile communication VLAN 90, the HeMS 40 connects to and communicates with the HeNBs 60-1 and 60-2 via the mobile communication VLAN 90. Via the mobile communication VLAN 90, the HeMS 40 monitors and controls the HeNBs 60-1 and 60-2 so as to manage operations.

The HeMS 40 manages network additional information of the HeNBs 60-1 and 60-2. When the network additional information of the HeNBs 60-1 and 60-2 has been registered, the HeMS 40 exercises control so as to register the network additional information of the HeNBs 60-1 and 60-2 in the DHCP server 50.

The network additional information includes address information set in the HeMS 40 and VLAN setting information serving as setting information of the mobile communication VLAN 90. The address information set in the HeMS 40 is an IP address. Alternatively, the address information set in the HeMS 40 may be a MAC address. The VLAN setting information includes, for example, a Priority Code Point (PCP), Canonical Format Indicator (CFI), and a VLAN identifier (ID) defined in Institute of Electrical and Electronics Engineers (IEEE) 802.1Q. The CFI is information indicating an address format and indicating whether or not the MAC address is in a canonical format. The VLAN ID is identification information identifying the mobile communication VLAN 90.

The HeMS 40 is configured so as to be able to receive an input of the VLAN setting information of the HeNBs 60-1 and 60-2 and manages the VLAN setting information of the HeNBs 60-1 and 60-2 that has been input. For example, the HeMS 40 may receive the VLAN setting information of the HeNBs 60-1 and 60-2 that is input by the user while using a Graphical User Interface (GUI), a tool, or a command or may receive the input from a storage device or another communication apparatus. The HeMS 40 registers the input VLAN setting information in the HeMS 40 and further causes the registered VLAN setting information to be included in the network additional information so as to be registered in the DHCP server 50.

For example, when the HeNBs 60-1 and 60-2 are to be connected to the same mobile communication VLAN 90, the HeMS 40 receives the input of the VLAN setting information of the mobile communication VLAN 90 for the HeNBs 60-1 and 60-2, in accordance with an input made by the user. In contrast, for example, when the HeNBs 60-1 and 60-2 are to be connected to mutually-different mobile communication VLANs 90, the HeMS 40 receives the input of the VLAN setting information of a corresponding one of the mobile communication VLANs 90 for each of the HeNBs 60-1 and 60-2, in accordance with an input made by the user. In other words, in accordance with the input made by the user, the HeMS receives the input of as many pieces of VLAN setting information as the number of mobile communication VLANs 90 to which the HeNBs 60-1 and 60-2 are to be connected.

The DHCP server 50 corresponds to the server apparatus 10 according to the first example embodiment. The DHCP server 50 is a server apparatus connected to the intra-corporation IP network 80. The DHCP server 50 registers the network additional information of the HeNBs 60-1 and 60-2 in the DHCP server 50 in accordance with control exercised by the HeMS 40.

The DHCP server 50 includes a DHCP protocol defined by Requests for Comments (RFCs) 2131 and 2132, as well as an IP address assignment function realized by an option function thereof. When the HeNBs 60-1 and 60-2 have transmitted DHCP Discover messages requesting that IP addresses be assigned, the DHCP server 50 assigns the IP addresses to the HeNBs 60-1 and 60-2. Let us assume that the DHCP server 50 has received the DHCP Discover messages from the HeNBs 60-1 and 60-2. By using a DHCP Offer message serving as a response message responding to the DHCP Discover message, the DHCP server 50 assigns the IP addresses to the HeNBs 60-1 and 60-2.

Further, the DHCP server 50 causes the DHCP Offer message to include the network additional information of the HeNBs 60-1 and 60-2 and transmits the DHCP Offer message to the HeNBs 60-1 and 60-2. The DHCP server 50 transmits the DHCP Offer message including the IP addresses to be assigned to the HeNBs 60-1 and 60-2 and the network additional information, to the HeNBs 60-1 and 60-2.

The HeNBs 60-1 and 60-2 each correspond to the wireless base station according to the first example embodiment. The HeNBs 60-1 and 60-2 connect to and communicate with the DHCP server 50 via the intra-corporation IP network 80. The HeNBs 60-1 and 60-2 transmit the DHCP Discover messages to the DHCP server 50 and receive the DHCP Offer message. Each of the HeNBs 60-1 and 60-2 obtains the corresponding one of the IP addresses to be assigned to the HeNBs 60-1 and 60-2 and the network additional information, out of the DHCP Offer message.

On the basis of the corresponding one of the obtained IP addresses assigned to the HeNBs 60-1 and 60-2 and the obtained network additional information, each of the HeNBs 60-1 and 60-2 connects to the mobile communication VLAN 90. When having connected to the mobile communication VLAN 90, the HeNBs 60-1 and 60-2 connect to and communicate with the HeMS and the EPC 70, via the mobile communication VLAN 90. The HeNBs 60-1 and 60-2 structure wireless areas 601-1 and 601-2 respectively and each provide a mobile communication service for communication terminals (not shown) positioned in the corresponding one of the wireless areas 601-1 and 601-2.

The EPC 70 is a mobile core node for providing the mobile communication service. Via the HeNBs 60-1 and 60-2, the EPC 70 provides the mobile communication service for the communication terminals (not shown) positioned in the wireless areas 601-1 and 601-2.

<An Example Configuration of the HeMS>

Figure 5:
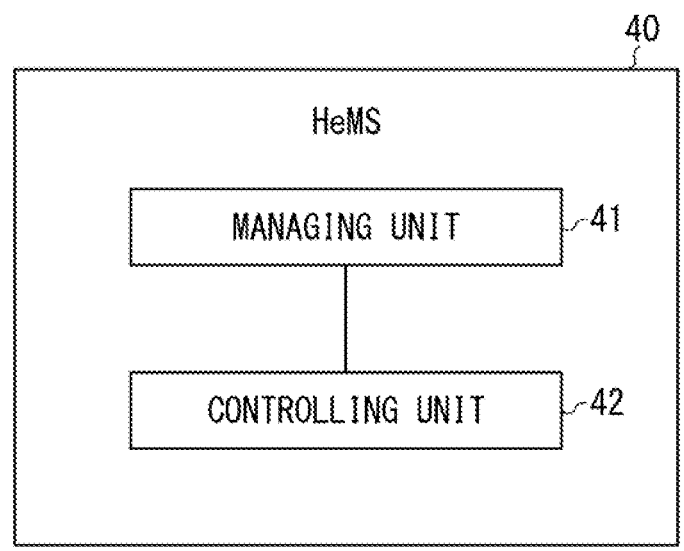
FIG. 5 is a block diagram showing an example configuration of a HeMS according to the second example embodiment.

Next, an example configuration of the HeMS 40 will be explained, with reference to FIG. 5. FIG. 5 is a block diagram showing an example configuration of the HeMS according to the second example embodiment. The HeMS 40 includes a managing unit 41 and a controlling unit 42.

The managing unit 41 is also configured as an input unit and receives an input of base station information of the HeNBs 60-1 and 60-2. Further, the managing unit 41 receives an input of the VLAN setting information that is used by the HeNBs 60-1 and 60-2 to connect to the mobile communication VLAN including the HeMS 40 and that is to be set in the HeNBs 60-1 and 60-2. The VLAN setting information includes a PCP, a CFI, and a VLAN ID.

The base station information includes the MAC addresses which are the address information to be set in the HeNBs 60-1 and 60-2. The base station information may include a port number of a relay apparatus provided in the intra-corporation IP network 80 to which the HeNBs 60-1 and 60-2 connect and may include position information of the positions in which the HeNBs 60-1 and 60-2 are arranged.

Further, the managing unit 41 is also configured as a storage unit and stores therein various types of setting information used by the HeMS 40. The managing unit 41 stores therein the base station information of the HeNBs 60-1 and 60-2. The managing unit 41 stores therein the IP address of the HeMS 40 and the VLAN setting information to be set in the HeNB 60-1 as the network additional information of the HeNB 60-1. Similarly, the managing unit 41 stores therein the IP address of the HeMS 40 and the VLAN setting information to be set in the HeNB 60-2 as the network additional information of the HeNB 60-2.

The controlling unit 42 controls functions included in the HeMS 40. The controlling unit 42 registers, in the DHCP server 50, the base station information of the HeNBs 60-1 and 60-2 and the network additional information set in the HeNBs 60-1 and 60-2. More specifically, the controlling unit 42 registers, in the DHCP server 50, the MAC addresses and the VLAN setting information of the HeNBs 60-1 and 60-2 and the IP address of the HeMS 40.

The controlling unit 42 may register the base station information and the network additional information in the DHCP server 50 by transmitting, to the DHCP server 50, a registration request command including the base station information and the network additional information of the HeNBs 60-1 and 60-2. Alternatively, the controlling unit 42 may register the base station information and the network additional information in the DHCP server 50, by connecting to the DHCP server 50 with the use of a remote control protocol or a remote control command and controlling the DHCP server 50.

The controlling unit 42 structures the mobile communication VLAN 90 in the intra-corporation IP network 80. When the HeNBs 60-1 and 60-2 have been connected to the mobile communication VLAN 90, the controlling unit 42 monitors and controls the HeNBs 60-1 and 60-2 via the mobile communication VLAN 90. When the IP addresses and the network additional information have been set in the HeNBs 60-1 and 60-2, the controlling unit 42 communicates with the HeNBs 60-1 and 60-2 via the mobile communication VLAN 90 by using the IP addresses and the network additional information. More specifically, the controlling unit 42 connects to and communicates with the HeNBs 60-1 and 60-2, by using the IP addresses of the HeNBs 60-1 and 60-2, the IP address of the HeMS 40, and the VLAN setting information.

<An Example Configuration of the DHCP Server>

Figure 6:
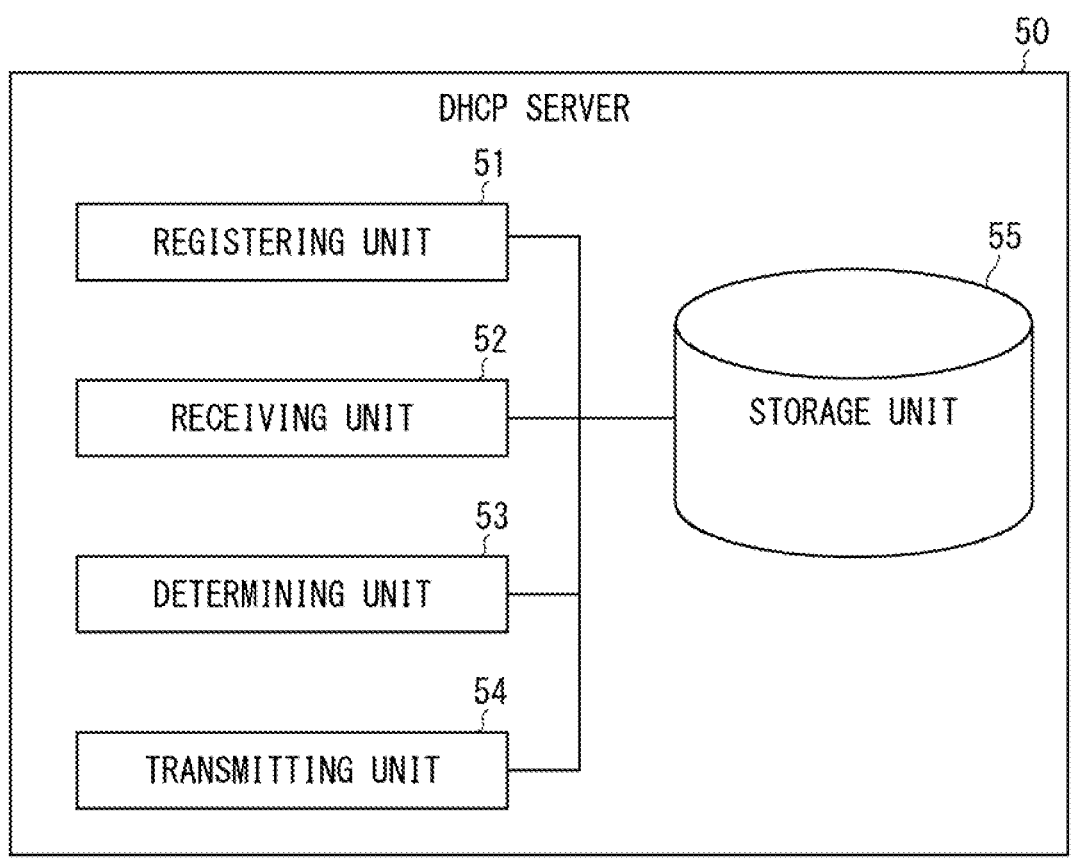
FIG. 6 is a block diagram showing an example configuration of a DHCP server according to the second example embodiment.

Next, an example configuration of the DHCP server 50 will be explained, with reference to FIG. 6. FIG. 6 is a block diagram showing the example configuration of the DHCP server according to the second example embodiment. The DHCP server 50 includes a registering unit 51, a receiving unit 52, a determining unit 53, a transmitting unit 54, and a storage unit 55.

The registering unit 51 corresponds to the registering unit 11 according to the first example embodiment. The registering unit 51 registers, in the storage unit 55, the base station information of the HeNBs 60-1 and 60-2 and the network additional information set in the HeNBs 60-1 and 60-2. In accordance with the control exercised by the HeMS 40, the registering unit 51 registers, in the storage unit 55, the base station information of the HeNBs 60-1 and 60-2 and the network additional information set in the HeNBs 60-1 and 60-2. More specifically, the registering unit 51 registers, in the storage unit 55, the MAC addresses of the HeNBs 60-1 and 60-2, the IP address set in the HeMS 40, and the VLAN setting information to be set in the HeNBs 60-1 and 60-2.

The registering unit 51 may receive the registration request command including the base station information and the network additional information of the HeNBs 60-1 and 60-2 from the HeMS 40 so as to register the base station information and the network additional information on the basis of the registration request command. Alternatively, the registering unit 51 may use a remote control protocol such as telnet, for example, so as to register the base station information and the network additional information of the HeNBs 60-1 and 60-2 on the basis of remote control exercised by the controlling unit 42 included in the HeMS 40.

The receiving unit 52 corresponds to the receiving unit 12 according to the first example embodiment. From the HeNBs 60-1 and 60-2, the receiving unit 52 receives the DHCP Discover messages serving as assignment requests for the IP addresses. Further, the receiving unit 52 receives DHCP Request messages from the HeNBs 60-1 and 60-2.

By using the base station information of the HeNBs 60-1 and 60-2, the determining unit 53 determines whether or not each of the HeNBs 60-1 and 60-2 is an HeNB to be connected to the mobile communication VLAN 90. By using the MAC addresses of the HeNBs 60-1 and 60-2, the determining unit 53 determines whether or not each of the HeNBs 60-1 and 60-2 is an HeNB to be connected to the mobile communication VLAN 90.

When having received the DHCP Discover messages, the determining unit 53 compares the MAC address of each of the HeNBs 60-1 and 60-2 stored in the storage unit 55 with the MAC address of the respective HeNB from which the DHCP Discover message was transmitted. When the compared MAC addresses are the same, the determining unit 53 determines that the HeNB from which the DHCP Discover message was transmitted is an HeNB to be connected to the mobile communication VLAN 90.

When the base station information includes the port number and/or the position information, the determining unit 53 may determine whether or not each of the HeNBs 60-1 and 60-2 is an HeNB to be connected to the mobile communication VLAN 90, by using at least one of the port number and the position information. The determining unit 53 may carry out the determining process by determining whether or not the port number and the position information of the HeNB from which the DHCP Discover message was transmitted are the same as the port number and the position information of the corresponding one of the HeNBs 60-1 and 60-2 stored in the storage unit 55.

The transmitting unit 54 corresponds to the transmitting unit 13 according to the first example embodiment. The transmitting unit 54 transmits the network additional information set in the HeNBs 60-1 and 60-2. When it is determined that the HeNB from which the DHCP Discover message was transmitted is an HeNB to be connected to the mobile communication VLAN 90, the transmitting unit 54 transmits a DHCP Offer message to the HeNB. The DHCP Offer message is a response message responding to the DHCP Discover message and is a message assigning the IP address to the HeNB from which the DHCP Discover message was transmitted.

The transmitting unit 54 causes the DHCP Offer message to include the IP address to be assigned to the HeNB from which the DHCP Discover message was transmitted and the network additional information to be set in the HeNB and transmits the DHCP Offer message. More specifically, the transmitting unit 54 transmits the DHCP Offer message including the IP address of the HeMS 40, the IP address to be assigned to the HeNB from which the DHCP Discover message was transmitted, and the VLAN setting information to be set in the HeNB.

For example, let us discuss an example in which the receiving unit 52 has received the DHCP Discover message from the HeNB 60-1, and the determining unit 53 has determined that the HeNB 60-1 is an HeNB to be connected to the mobile communication VLAN 90. In this situation, the transmitting unit 54 transmits, to the HeNB 60-1, an DHCP Offer message including the IP address to be assigned to the HeNB 60-1, the IP address of the HeMS 40, and the VLAN setting information of the mobile communication VLAN 90 to which the HeNB 60-1 is to connect.

The transmitting unit 54 corresponds to a Vender Specific Information function of Option 43 defined in RFC 2132. The transmitting unit 54 sets, into in vender specific information, the network additional information to be set in the HeNB from which the DHCP Discover message was transmitted. The transmitting unit 54 transmits the DHCP Offer message including the vender specific information in which the network additional information has been set. Further, when the receiving unit 52 has received the DHCP Request messages from the HeNBs 60-1 and 60-2, the transmitting unit 54 transmits DHCP Acknowledge messages to the HeNBs 60-1 and 60-2.

Figure 7:
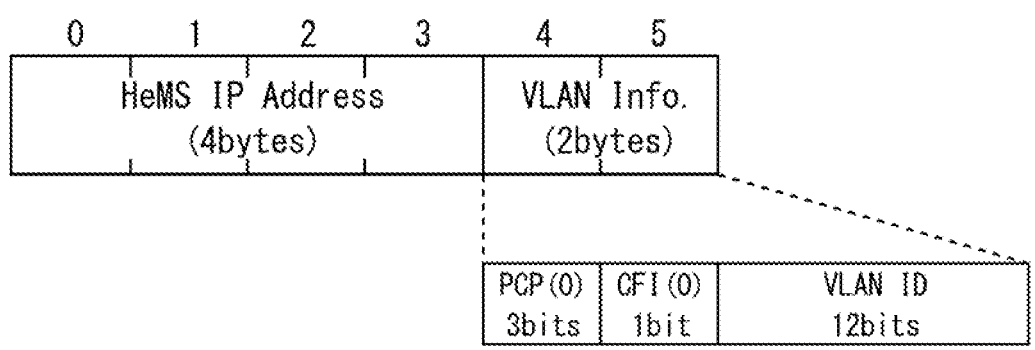
FIG. 7 is a drawing for explaining an example of network additional information.

Next, an example of the network additional information to be set in the vender specific information will be explained, with reference to FIG. 7. FIG. 7 is a drawing for explaining the example of the network additional information. As explained above, the network additional information includes the IP address set in the HeMS 40 and the VLAN setting information to be set in the HeNB to which the DHCP Offer message is transmitted. Further, the VLAN setting information includes a PCP, a CFI, and a VLAN ID.

In the example shown in FIG. 7, the IP address set in the HeMS 40 is set in a HeMS IP address region represented by a 4-byte region starting from the head of the vender specific information. Further, the VLAN setting information to be set in the HeNB to which the DHCP Offer message is transmitted is set in a VLAN Info. region represented by a 2-byte region, which corresponds to the four byte and the five byte of the vender specific information. Further, the PCP, the CFI, and the VLAN ID included in the VLAN setting information are set in regions of 3 bits, 1 bit, and 12 bits, respectively, starting from the head of the VLAN Info. region.

Returning to the description of FIG. 6, the storage unit 55 will be explained. The storage unit 55 stores therein various types of setting information used by the DHCP server 50. In accordance with registration control exercised by the registering unit 51, the storage unit 55 stores therein the base station information of the HeNBs 60-1 and 60-2 and the network additional information to be set in the HeNBs 60-1 and 60-2.

<An Example Configuration of the HeNBs>

Figure 8:
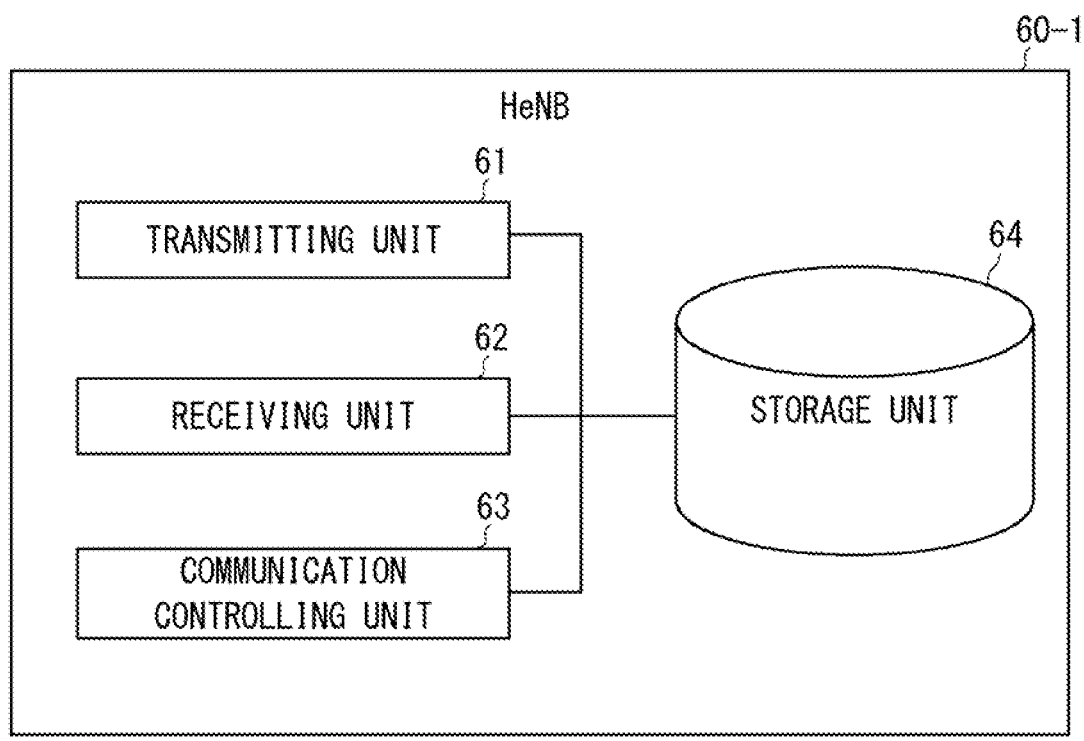
FIG. 8 is a block diagram showing an example configuration of an HeNB according to the second example embodiment.

Next, the HeNBs 60-1 and 60-2 will be explained, with reference to FIG. 8. FIG. 8 is a block diagram showing an example configuration of an HeNB according to the second example embodiment. Because the example configurations of the HeNBs 60-1 and 60-2 are the same each other, the HeNB 60-1 will be explained. The HeNB 60-1 includes a transmitting unit 61, a receiving unit 62, a communication controlling unit 63, and a storage unit 64.

The transmitting unit 61 corresponds to the transmitting unit 21 according to the first example embodiment. The transmitting unit 61 transmits, to the DHCP server 50, the DHCP Discover message requesting that an IP address be assigned. When the HeNB 60-1 is started up, the transmitting unit 61 determines whether or not the storage unit 64 has stored therein at least one of: the IP address of the HeNB 60-1, the VLAN setting information to be set in the HeNB 60-1, and the IP address of the HeMS 40. When at least one of the abovementioned pieces of information is not stored in the storage unit 64, the transmitting unit 61 transmits the DHCP Discover message to the DHCP server 50. Further, the transmitting unit 61 transmits the DHCP Request message.

The receiving unit 62 corresponds to the receiving unit 22 according to the first example embodiment. The receiving unit 62 receives the DHCP Offer message including the IP address to be assigned to the HeNB 60-1 and the network additional information to be set in the HeNB 60-1. More specifically, the receiving unit 62 receives the DHCP Offer message including the IP address of the HeMS 40, the IP address to be assigned to the HeNB 60-1, and the VLAN setting information to be set in the HeNB 60-1. As explained above, the DHCP Offer message is a response message responding to the DHCP Discover message. The receiving unit 62 receives the DHCP Offer message including the vender specific information that has set therein the IP address of the HeMS 40, the IP address to be assigned to the HeNB 60-1, and the VLAN setting information to be set in the HeNB 60-1. When having received the IP address of the HeMS 40, the IP address to be assigned to the HeNB 60-1, and the VLAN setting information to be set in the HeNB 60-1, the receiving unit 62 stores the received information in the storage unit 64. Further, the receiving unit 62 receives the DHCP Acknowledge message.

The communication controlling unit 63 corresponds to the communication controlling unit 23 according to the first example embodiment. When the receiving unit 62 has received the IP address to be assigned to the HeNB 60-1 and the network additional information to be set in the HeNB 60-1, the communication controlling unit 63 obtains the received information from the storage unit 64. More specifically, the communication controlling unit 63 obtains the IP address of the HeMS 40, the IP address to be assigned to the HeNB 60-1, and the VLAN setting information to be set in the HeNB 60-1. The communication controlling unit 63 sets the IP address of the HeMS 40, the IP address to be assigned to the HeNB 60-1, and the VLAN setting information to be set in the HeNB 60-1, into the HeNB 60-1.

By using the IP address of the HeMS 40, the IP address of the HeNB 60-1, and the VLAN setting information that has been set in the HeNB 60-1, the communication controlling unit 63 connects to the mobile communication VLAN 90 to which the HeNB 60-1 is to connect. Via the mobile communication VLAN 90 being connected, the communication controlling unit 63 communicates with the HeMS 40 and the EPC 70. The communication controlling unit 63 provides the mobile communication service for the communication terminals (not shown) positioned in the wireless areas 601-1 and 601-2.

The storage unit 64 stores therein various types of setting information used by the HeNB 60-1. In accordance with control exercised by the receiving unit 62, the storage unit 64 stores therein the IP address assigned to the HeNB 60-1 and the network additional information set in the HeNB 60-1.

<An Example Operation of the Communication System>

Figure 9:
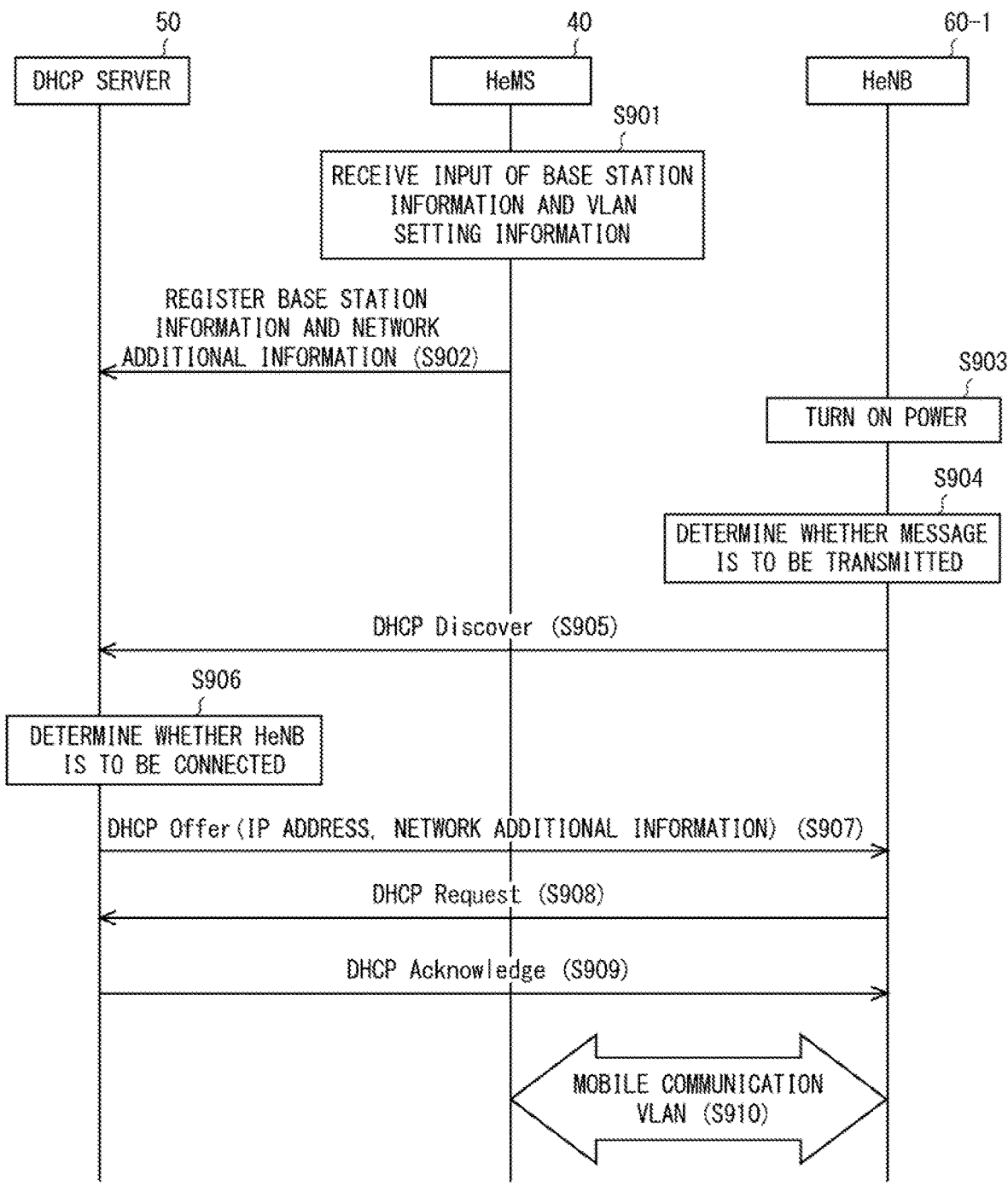
FIG. 9 is a sequence chart showing an example operation of the communication system according to the second example embodiment.

Next, an example operation of the communication system 200 according to the second example embodiment will be explained, with reference to FIG. 9. FIG. 9 is a sequence chart showing the example operation of the communication system according to the second example embodiment. FIG. 9 corresponds to FIG. 3 and shows a setting sequence from the time when the HeNB 60-1 or the HeNB 60-2 is connected to the intra-corporation IP network 80 after being shipped from the factory, up to the time when the HeNB connects to the mobile communication VLAN 90. Because operation examples of the HeNB 60-1 and the HeNB 60-2 are the same as each other, the example using the HeNB 60-1 will be explained.

To begin with, the user inputs the base station information of the HeNB 60-1 and the VLAN setting information of the mobile communication VLAN 90 to which the HeNB 60-1 is to connect. The managing unit 41 receives the input of the base station information of the HeNB 60-1 and the VLAN setting information that is used for connecting to the mobile communication VLAN including the HeMS 40 and is to be set in the HeNB 60-1 (step S901).

Subsequently, the controlling unit 42 and the registering unit 51 register, in the storage unit 55, the base station information of the HeNB 60-1 and the network additional information to be set in the HeNB 60-1 (step S902). The controlling unit 42 may cause the registering unit 51 to register the base station information and the network additional information, by transmitting a registration request command including the base station information and the network additional information of the HeNB 60-1 to the registering unit 51. Alternatively, the controlling unit 42 may cause the registering unit 51 to register the base station information and the network additional information, by connecting to the DHCP server 50 with the use of a remote control protocol and remotely controlling the registering unit 51.

Subsequently, the user turns on the power of the HeNB 60-1, so that the HeNB 60-1 starts up (step S903). The transmitting unit 61 determines whether a DHCP Discover message is to be transmitted (step S904). The transmitting unit 61 determines whether or not the storage unit 64 has stored therein at least one of: the IP address of the HeNB 60-1, the VLAN setting information to be set in the HeNB 60-1, and the IP address of the HeMS 40.

When at least one of the abovementioned pieces of information is not stored in the storage unit 64, the transmitting unit 61 transmits a DHCP Discover message, so that the receiving unit 52 receives the DHCP Discover message (step S905). On the contrary, when all of the abovementioned pieces of information are stored in the storage unit 64, the transmitting unit 61 connects to the mobile communication VLAN 90 and ends the process.

Subsequently, the determining unit 53 determines whether or not the HeNB 60-1 is to be connected (step S906). By using the MAC address of the HeNB 60-1, the determining unit 53 determines whether or not the HeNB 60-1 is an HeNB to be connected to the mobile communication VLAN 90. Upon receipt of the DHCP Discover message, the determining unit 53 compares the MAC address of the HeNB 60-1 stored in the storage unit 55 with the MAC address included in the DHCP Discover message. When the compared MAC addresses are the same as each other, the determining unit 53 determines that the HeNB 60-1 is an HeNB to be connected to the mobile communication VLAN 90.

When it is determined that the HeNB 60-1 is an HeNB to be connected to the mobile communication VLAN 90, the transmitting unit 54 transmits a DHCP Offer message, so that the receiving unit 62 receives the DHCP Offer message (step S907). The DHCP Offer message includes the IP address to be assigned to the HeNB 60-1 and the network additional information to be set in the HeNB 60-1. More specifically, the DHCP Offer message includes the IP address of the HeMS 40, the IP address to be assigned to the HeNB 60-1, and the VLAN setting information to be set in the HeNB 60-1. Also, the DHCP Offer message includes vender specific information, while the vender specific information has been set therein the IP address of the HeMS 40 and the VLAN setting information to be set in the HeNB 60-1. On the contrary, when the HeNB 60-1 is not determined to be an HeNB to be connected to the mobile communication VLAN 90, the transmitting unit 54 does not transmit the DHCP Offer message and ends the process.

When the receiving unit 62 has received the DHCP Offer message, the transmitting unit 61 transmits a DHCP Request message, so that the receiving unit 52 receives the DHCP Request message (step S908).

When the receiving unit 52 has received the DHCP Request message, the transmitting unit 54 transmits a DHCP Acknowledge message, so that the receiving unit 62 receives the DHCP Acknowledge (step S909).

The communication controlling unit 63 and the controlling unit 42 establish connection and perform communication via the mobile communication VLAN 90, by using the IP address of the HeMS 40, the IP address of the HeNB 60-1, and the VLAN setting information set in the HeNB 60-1 (step S901). The communication controlling unit 63 sets, in the HeNB 60-1, the IP address of the HeMS 40, the IP address to be assigned to the HeNB 60-1, and the VLAN setting information to be set in the HeNB 60-1. The communication controlling unit 63 and the controlling unit 42 establish connection and perform communication via the mobile communication VLAN 90 to which the HeNB 60-1 and the HeMS 40 are connected. The communication controlling unit 63 communicates with the EPC 70 and provides the mobile communication service for the communication terminals (not shown) positioned in the wireless areas 601-1 and 601-2.

As explained above, in the present example embodiment also, as a result of the DHCP server 50 having registered therein the IP address of the HeMS 40 and the VLAN setting information, it is possible to automatically set the IP address of the HeMS 40 and the VLAN setting information into the HeNBs 60-1 and 60-2. Accordingly, using the communication system 200 makes it possible to reduce the work and effort required of the user to manually set the IP address of the HeMS 40 and the VLAN setting information into the HeNBs 60-1 and 60-2. Consequently, by using the communication system 200 according to the second example embodiment, it is possible to reduce the workload in the setting process.

Further, in the present example embodiment, when the user has registered, in the HeMS 40, the base station information of the HeNBs 60-1 and 60-2 and the network additional information, the HeMS 40 exercises control so that the base station information and the network additional information are also registered in the DHCP server 50. In other words, without the user having to register the base station information of the HeNBs 60-1 and 60-2 and the network additional information in the DHCP server 50, the HeMS 40 exercises control so that these pieces of information are registered in the DHCP server 50. Further, in collaboration with the HeNBs 60-1 and 60-2, the DHCP server 50 operates so that the information set in the HeMS 40 is set into the HeNBs 60-1 and 60-2. In this manner, according to the present example embodiment, the HeMS 40, the DHCP server 50, and the HeNBs 60-1 and 60-2 collaborate with one another, so that the information registered in the HeMS 40 is also shared by the DHCP server 50 and the HeNBs 60-1 and 60-2. Consequently, in the communication system 200 according to the present example embodiment, without the user having to set the necessary information in each of all the apparatuses, the information registered in the HeMS 40 is shared by the apparatuses in collaboration. It is therefore possible to reduce the workload of the user in the setting process.

Further, as explained above, according to the present example embodiment, without the user having to manually set the network additional information into each of the HeNBs, the HeNBs are able to connect to the HeMS in the mobile communication VLAN, while in the factory shipment state. In other words, by using the communication system 200 according to the present example embodiment, when each HeNB is installed, the HeNB is capable, while being kept in the factory shipment state, of connecting to the intra-corporation IP network 80 and performing communication via the mobile communication VLAN 90, without the need to set the connection destination VLAN setting information or the like therein in advance.

Other Example Embodiments

Figure 10:
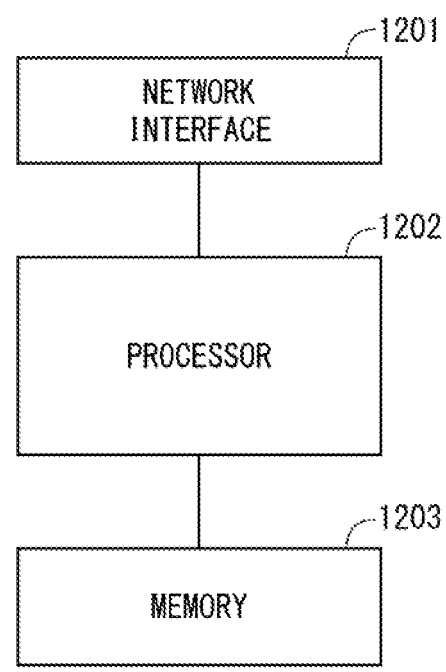
FIG. 10 is a block diagram showing an example of a hardware configuration of a server apparatus and the like according to the example embodiments of the present disclosure.

The server apparatus 10, the wireless base station 20, the monitoring apparatus 30, the HeMS 40, the DHCP server 50, and the HeNBs 60-1 and 60-2 (hereinafter, "the server apparatus 10 and the like") described in the above example embodiments may have a hardware configuration as described below. FIG. 10 is a block diagram showing an example of a hardware configuration of the server apparatus and the like according to the example embodiments of the present disclosure.

As shown in FIG. 10, the server apparatus 10 and the like include a network interface 1201, a processor 1202, and a memory 1203. The network interface 1201 is used for communicating with another communication apparatus having a communication function. The network interface 1201 may include a network interface card (NIC) compliant with any of communication schemes including, for example, the Institute of Electrical and Electronics Engineers (IEEE) 802.11 series and the IEEE 802.3 series.

By reading and executing software (a computer program) from the memory 1203, the processor 1202 performs the processes performed by the server apparatus 10 and the like explained with reference to the flowcharts in the above example embodiments. For example, the processor 1202 may be a microprocessor, a Micro Processing Unit (MPU), or a Central Processing Unit (CPU). The processor 1202 may include a plurality of processors.

The memory 1203 is structured by combining together a volatile memory and a non-volatile memory. The memory 1203 may include storage provided separately from the processor 1202. In that situation, the processor 1202 may access the memory 1203 via an I/O interface (not shown).

In the example in FIG. 10, the memory 1203 is used for storing therein a software module group. By reading and executing the software module group from the memory 1203, the processor 1202 is able to perform the processes performed by the server apparatus 10 and the like described in the above example embodiments.

As explained with reference to FIG. 10, each of the processors included in the server apparatus 10 and the like executes one or more programs including a group of instructions for causing a computer to execute an algorithm explained with reference to the drawings.

In the example described above, the one or more programs include the group of instructions (or software codes) that, when being read by the computer, cause the computer to execute one or more of the functions described in the example embodiments. The one or more programs may be stored in a non-transitory computer-readable medium or a substantive storage medium. Examples of the computer-readable medium or the substantive storage medium include, but are not limited to, a Random Access Memory (RAM), a Read-Only Memory (ROM), a flash memory, a Solid-State Drive (SSD), and other memory technology, a CD-ROM, a Digital Versatile Disc (DVD) a Blu-ray (registered trademark) disc, and other types of optical disc storage, a magnetic cassette, a magnetic tape, magnetic disc storage, and other types of magnetic storage devices. The one or more programs may be transmitted on a transitory computer-readable medium or a communication medium. Examples of the transitory computer-readable medium or the communication medium include, but are not limited to, a propagation signal that is electrical, optical, acoustic, or in other formats.

The invention of the present application has thus been explained, with reference to the example embodiments; however, the invention of the present application is not limited to the example embodiments described above. It is possible to apply any of various modifications that could be understood by a person skilled in the art within the scope of the invention, to the configurations and the details of the invention of the present application. Further, the present disclosure may be carried out by combining any of the example embodiments together, as appropriate.

A part or all of the example embodiments described above may be described as presented in the Supplementary notes below, but are not limited to these examples.

<Supplementary Note 1>

A server apparatus including:
a registering unit configured to register first address information set in a monitoring apparatus that monitors a wireless base station and VLAN setting information serving as setting information of a Virtual Local Area Network (VLAN) including the monitoring apparatus;
a receiving unit configured to receive, from the wireless base station, an assignment request for second address information; and
a transmitting unit configured to transmit the first address information, the second address information, and the VLAN setting information to the wireless base station.

<Supplementary Note 2>

The server apparatus according to Supplementary note 1, wherein
the registering unit further registers third address information set in the wireless base station,
the server apparatus further includes a determining unit configured to determine, by using the third address information, whether or not the wireless base station is a wireless base station to be connected to the VLAN, and
when the wireless base station is determined to be a wireless base station to be connected to the VLAN, the transmitting unit transmits the first address information, the second address information, and the VLAN setting information.

<Supplementary Note 3>

The server apparatus according to Supplementary note 2, wherein the registering unit registers the first address information, the VLAN setting information, and the third address information in accordance with control exercised by the monitoring apparatus.

<Supplementary Note 4>

The server apparatus according to any one of Supplementary notes 1 to 3, wherein
the receiving unit receives a first message indicating the assignment request, and
the transmitting unit causes a second message serving as a response message responding to the first message to include the first address information, the second address information, and the VLAN setting information and transmits the second message.

<Supplementary Note 5>

The server apparatus according to Supplementary note 4, wherein the second message is a Dynamic Host Configuration Protocol (DHCP) Offer message.

<Supplementary Note 6>

The server apparatus according to Supplementary note 4 or 5, wherein
the second message includes vender specific information, and
the transmitting unit sets the first address information and the VLAN setting information into the vender specific information.

<Supplementary Note 7>

A wireless base station including:
a transmitting unit configured to transmit, to a server apparatus, an assignment request for first address information;
a receiving unit configured to receive, from the server apparatus, VLAN setting information serving as setting information of a Virtual Local Area Network (VLAN) including a monitoring apparatus, the first address information, and second address information set in the monitoring apparatus; and
a communication controlling unit configured to communicate with the monitoring apparatus via the VLAN, by using the first address information, the second address information, and the VLAN setting information.

<Supplementary Note 8>

The wireless base station according to Supplementary note 7, wherein
the transmitting unit transmits a first message indicating the assignment request, and
the receiving unit receives a second message that serves as a response message responding to the first message and that includes the VLAN setting information, the first address information, and the second address information.

<Supplementary Note 9>

The wireless base station according to Supplementary note 8, wherein the second message is a Dynamic Host Configuration Protocol (DHCP) Offer message.

<Supplementary Note 10>

The wireless base station according to Supplementary note 8 or 9, wherein
the second message includes vender specific information, and
the transmitting unit sets the second address information and the VLAN setting information into the vender specific information.

<Supplementary Note 11>

The wireless base station according to any one of Supplementary notes 7 to 10, wherein, upon a start-up of the wireless base station, when the wireless base station has not stored therein at least one of the first address information, the second address information, and the VLAN setting information, the transmitting unit transmits the assignment request to the server apparatus.

<Supplementary Note 12>

A monitoring apparatus including:
a managing unit configured to receive an input of first address information set in a wireless base station and VLAN setting information serving as setting information of a Virtual Local Area Network (VLAN) including the monitoring apparatus; and
a controlling unit configured to register, in a server apparatus, the first address information, the VLAN setting information, and second address information set in the monitoring apparatus and configured to communicate with the wireless base station via the VLAN by using the first address information, the second address information, and the VLAN setting information.

<Supplementary Note 13>

A communication controlling method including:
registering first address information set in a monitoring apparatus that monitors a wireless base station and VLAN setting information serving as setting information of a Virtual Local Area Network (VLAN) including the monitoring apparatus;
receiving, from the wireless base station, an assignment request for second address information; and
transmitting, to the wireless base station, the first address information, the second address information, and the VLAN setting information.

<Supplementary Note 14>

A communication controlling method including:
transmitting, to a server apparatus, an assignment request for first address information;
receiving, from the server apparatus, VLAN setting information serving as setting information of a Virtual Local Area Network (VLAN) including a monitoring apparatus, the first address information, and second address information set in the monitoring apparatus; and communicating with the monitoring apparatus via the VLAN, by using the first address information, the second address information, and the VLAN setting information.

<Supplementary Note 15>

A communication controlling method to be implemented by a monitoring apparatus, the communication controlling method including:

receiving an input of first address information set in a wireless base station and VLAN setting information serving as setting information of a Virtual Local Area Network (VLAN) including the monitoring apparatus; and registering, in a server apparatus, the first address information, the VLAN setting information, and second address information set in the monitoring apparatus and communicating with the wireless base station via the VLAN by using the first address information, the second address information, and the VLAN setting information.

<Supplementary Note 16>

A communication controlling program configured to cause a computer to execute a process of:

registering first address information set in a monitoring apparatus that monitors a wireless base station and VLAN setting information serving as setting information of a Virtual Local Area Network (VLAN) including the monitoring apparatus;

receiving, from the wireless base station, an assignment request for second address information; and transmitting, to the wireless base station, the first address information, the second address information, and the VLAN setting information.

<Supplementary Note 17>

A communication controlling program configured to cause a computer to execute a process of:

transmitting, to a server apparatus, an assignment request for first address information;

receiving, from the server apparatus, VLAN setting information serving as setting information of a Virtual Local Area Network (VLAN) including a monitoring apparatus, the first address information, and second address information set in the monitoring apparatus; and communicating with the monitoring apparatus via the VLAN, by using the first address information, the second address information, and the VLAN setting information.

<Supplementary Note 18>

A communication controlling program executed by a monitoring apparatus, the communication controlling program including a process of:

receiving an input of first address information set in a wireless base station and VLAN setting information serving as setting information of a Virtual Local Area Network (VLAN) including the monitoring apparatus; and registering, in a server apparatus, the first address information, the VLAN setting information, and second address information set in the monitoring apparatus and communicating with the wireless base station via the VLAN by using the first address information, the second address information, and the VLAN setting information.

<Supplementary Note 19>

A communication system including a monitoring apparatus, a server apparatus, and a wireless base station, wherein the monitoring apparatus receives an input of first address information set in the wireless base station and VLAN setting information serving as setting information of a Virtual Local Area Network (VLAN) including the monitoring apparatus and registers, in the server apparatus, the first address information, the VLAN setting information, and second address information set in the monitoring apparatus, the server apparatus receives, from the wireless base station, an assignment request for third address information and, when the wireless base station is a wireless base station to be connected to the VLAN on a basis of the first address information, transmits the VLAN setting information, the second address information, and the third address information to the wireless base station, and the wireless base station transmits the request to the server apparatus, receives, from the server apparatus, the VLAN setting information, the second address information, and the third address information, and communicates with the monitoring apparatus via the VLAN by using the second address information, the third address information, and the VLAN setting information.

This application is based upon and claims the benefit of priority from Japanese Patent Application No. 2020-137926, filed on Aug. 18, 2020, the entire contents of which are incorporated herein by reference.

REFERENCE SIGNS LIST

100, 200 Communication System
10 Server Apparatus
20 Wireless Base Station
30 Monitoring Apparatus
40 Hems
41 Managing Unit
42 Controlling Unit
50 Dhcp Server
51 Registering Unit
52, 62 Receiving Unit
53 Determining Unit
54, 61 Transmitting Unit
55, 64 Storage Unit
60-1, 60-2 Henb
70 Epc
80 Intra-Corporation IP Network
90 Mobile Communication Vlan
601-1, 601-2 Wireless Area
63 Communication Controlling Unit
101 Dhcp Server
102 HeMS
103 HeNB

What is claimed is:

1. A server apparatus comprising:
at least one memory storing instructions, and
at least one processor configured to execute the instructions to:
register first address information set in a monitoring apparatus that monitors a wireless base station and VLAN setting information serving as setting information of a Virtual Local Area Network (VLAN) including the monitoring apparatus, wherein the monitoring apparatus comprises at least one second processor;

receive from the wireless base station, an assignment request for second address information; and transmit a Dynamic Host Configuration Protocol (DHCP) Offer message including vender specific information, and the second address information to the wireless base station, wherein the vender specific information includes the first address information and the VLAN setting information.

2. The server apparatus according to claim 1, wherein the at least one processor further registers third address information set in the wireless base station, the at least one processor configured to execute the instructions to:

determine by using the third address information, whether or not the wireless base station is a wireless base station to be connected to the VLAN, and when the wireless base station is determined to be a wireless base station to be connected to the VLAN, the at least one processor transmits the first address information, the second address information, and the VLAN setting information.

3. The server apparatus according to claim 2, wherein the at least one processor registers the first address information, the VLAN setting information, and the third address information in accordance with control exercised by the monitoring apparatus.

4. A wireless base station comprising:

at least one memory storing instructions, and at least one processor configured to execute the instructions to:

transmit to a server apparatus comprising at least one second processor, an assignment request for second address information;

receive from the server apparatus, a Dynamic Host Configuration Protocol (DHCP) Offer message including vender specific information, and first address information set in the monitoring apparatus, wherein the vender specific information includes the first address information and VLAN setting information serving as setting information of a Virtual Local Area Network (VLAN) including a monitoring apparatus; and communicate with the monitoring apparatus via the VLAN, by using the first address information, the second address information, and the VLAN setting information.

5. The wireless base station according to claim 4, wherein, upon a start-up of the wireless base station, when the wireless base station has not stored therein at least one of the first address information, the second address information, and the VLAN setting information, the at least one processor transmits the assignment request to the server apparatus.

6. A communication controlling method comprising:

registering first address information set in a monitoring apparatus that monitors a wireless base station and VLAN setting information serving as setting information of a Virtual Local Area Network (VLAN) including the monitoring apparatus;

receiving, from the wireless base station, an assignment request for second address information; and transmitting, to the wireless base station, a Dynamic Host Configuration Protocol (DHCP) Offer message including vender specific information, and the second address information, wherein the vender specific information includes the first address information and the VLAN setting information.

7. A communication controlling method comprising:

transmitting, to a server apparatus, an assignment request for second address information;

receiving, from the server apparatus, a Dynamic Host Configuration Protocol (DHCP) Offer message including vender specific information, and first address information set in the monitoring apparatus, wherein the vender specific information includes the first address information and VLAN setting information serving as setting information of a Virtual Local Area Network (VLAN) including a monitoring apparatus; and communicating with the monitoring apparatus via the VLAN, by using the first address information, the second address information, and the VLAN setting information.

8. A communication system comprising a monitoring apparatus, a server apparatus, and a wireless base station, wherein the monitoring apparatus comprising:

at least one memory storing instructions, and at least one processor configured to execute the instructions to:

receive an input of second address information set in the wireless base station and VLAN setting information serving as setting information of a Virtual Local Area Network (VLAN) including the monitoring apparatus and registers, in the server apparatus, the second address information, the VLAN setting information, and first address information set in the monitoring apparatus, the server apparatus comprising:

at least one memory storing instructions, and at least one processor configured to execute the instructions to:

receive from the wireless base station, an assignment request for third address information and, when the wireless base station is a wireless base station to be connected to the VLAN on a basis of the second address information, transmit a Dynamic Host Configuration Protocol (DHCP) Offer message including vender specific information, and the second address information to the wireless base station, wherein the vender specific information includes the first address information and the VLAN setting information, and the wireless base station comprising:

at least one memory storing instructions, and at least one processor configured to execute the instructions to:

transmit the request to the server apparatus, receive from the server apparatus, the VLAN setting information, the first address information, and the third address information, and communicates with the monitoring apparatus via the VLAN by using the first address information, the third address information, and the VLAN setting information.

* * * * *